J. A. CAMERON.
MOVING PICTURE MACHINE.
APPLICATION FILED NOV. 21, 1910.

1,005,936.  Patented Oct. 17, 1911.

Witnesses:
John J. Kittel
Teresa V. Lynch

Inventor
James A. Cameron
By his Attorneys
Brock Beeken & Auth

UNITED STATES PATENT OFFICE.

JAMES A. CAMERON, OF NEW YORK, N. Y.

MOVING-PICTURE MACHINE.

1,005,936.  Specification of Letters Patent.  Patented Oct. 17, 1911.

Application filed November 21, 1910. Serial No. 593,335.

*To all whom it may concern:*

Be it known that I, JAMES A. CAMERON, a citizen of the United States, and a resident of the borough of Brooklyn, in the county of Kings, city and State of New York, have invented certain new and useful Improvements in Moving-Picture Machines; of which the following is a specification.

The present invention relates more particularly to the mechanism for guiding the film and for imparting the continuous feeding movement thereto.

In machines of the character to which my invention has especial reference, there is usually provided a sprocket roll or some such equivalent device for imparting a continuous feeding movement to the film, and a device for imparting an intermittent advancing movement to the film, these two mechanisms being so related as to maintain a degree of slack in the film between the film feeding device and the intermittent film advancing mechanism, for the advancing mechanism to act upon. Various means have been devised for adjusting the loop or degree of slack in the film.

One object of my invention is to simplify and improve the mechanism for adjusting the size of the loop. This object I accomplish by the use of a film feeding roll which has adjustable connection with the gears which operate it.

Other objects of my invention are to guide and control the looped portion of the film and to facilitate the threading of the film through the machine in the first instance.

The manner in which I accomplish these results will be hereinafter fully disclosed.

In the accompanying drawings I have illustrated a preferred embodiment of my invention but I would have it understood that various changes and modifications may be made therein without departing from the spirit and scope of the invention.

Figure 1:
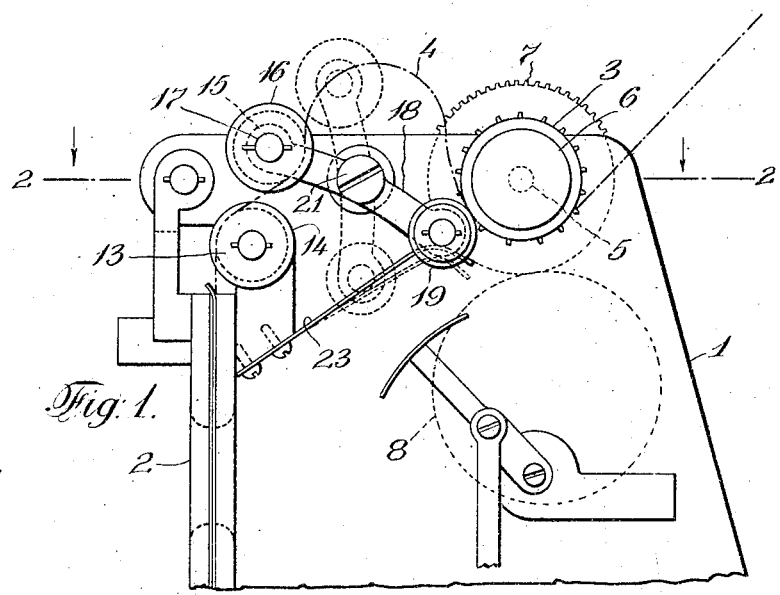
Figure 2:
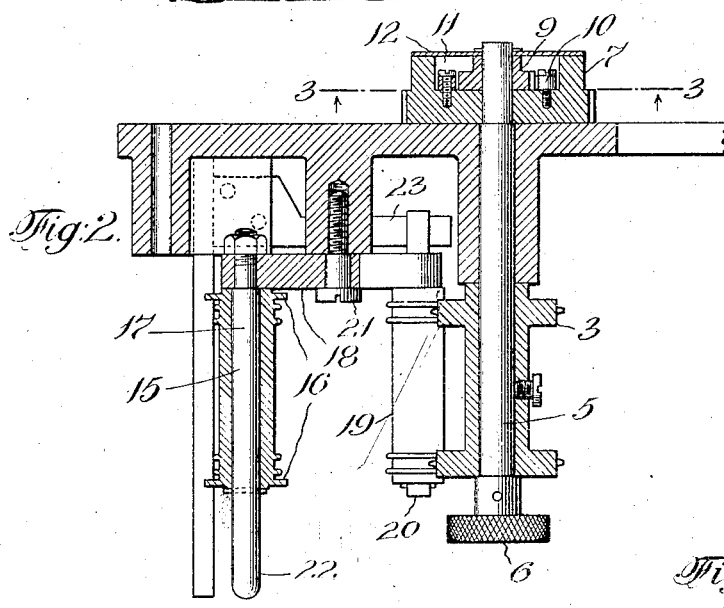
Figure 3:
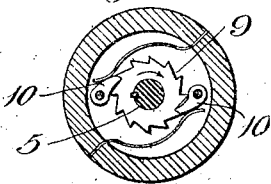

In the drawings: Figure 1 is a broken side elevation of the upper portion of a moving picture machine, showing my invention applied thereto. Fig. 2 is a horizontal sectional view taken on the line 2—2 of Fig. 1. Fig. 3 is another sectional view taken on the line 3—3 of Fig. 2.

Like reference characters denote corresponding parts throughout the several views.

The numeral 1 denotes a portion of the frame of a moving picture machine of that type wherein the film is intermittently advanced past an exposure opening 2, by means of a film advancing device of some sort, and a film feeding device 3 is used to provide a loop 4 or a certain amount of slack in the film at a point in advance of the exposure opening. This so-called film feeding device 3, which I have here shown as in the form of a constantly rotating sprocket, is preferably located in the upper portion of the machine so as to gradually withdraw the film from the film magazine and feed it forward so as to be advanced by the film advancing means. This film sprocket or roll, thus always maintains a loop of loose film for the film advancing means to act upon, and inasmuch as it is sometimes necessary to adjust the amount of this loop, I have provided a form of adjustable connection between the film feeding roll and its driving means. Accordingly, the said roll is preferably fixedly engaged upon a shaft 5 which is journaled on the frame, and a handle 6 of some sort is used for rotatably adjusting the sprocket for the purpose of regulating the size of the loop. This handle may form a part of or be secured to the sprocket, or, as shown in the drawings, it may simply be made fast on the end of the shaft. Upon the other end of this shaft there is loosely engaged a driven gear 7 which receives motion from an intermeshing driving gear 8. The adjustable connection between the driven gear and the shaft which carries the sprocket preferably consists of a ratchet 9 and one or more spring-pressed pawls 10. As a matter of convenience, the ratchet would preferably be carried by the shaft and the pawls by the driven gear but this relation may of course be reversed. As a means of protection against possible injury and derangement, the pawls are preferably located within an annular recess 11 formed in the face of the driven gear, the ratchet being received in this recess as well (see particularly Fig. 2). This annular recess is preferably closed by a cover 12 so that the adjustable driving connection of the sprocket is wholly protected. This pawl and ratchet construction permits the sprocket to be independently adjusted at will in the direction of rotation so that the amount of film loop may be regulated to any desired degree.

I have shown my improved film feeding roll in use as a loop producing device but it is not confined to this particular use and may be employed wherever an adjustable film feeding device is desired.

Before reaching the exposure opening, the film is preferably passed over a guide of some sort, usually in the form of a guide roll 13, having end flanges 14 for giving the desired lateral register to the film. In order to confine the film loop somewhat and to assist in securing the lateral register of the film, I preferably locate a guide 15 in advance of the guide roll 13. This guide may also be in the form of a guide roll, substantially as shown in Figs. 1 and 2, and may be provided with confining flanges 16 for holding the film in proper alinement with the exposure opening. In order to facilitate the threading up of the film, the loop confining guide roll is preferably movably related to the first guide roll 13. For this reason it may be engaged on a pintle 17 carried by one end of a pivoted swinging support 18.

Some means are usually necessary to confine the film in proper engagement with the film feeding roll. Such means I provide preferably in the form of a guard roll 19. This guard roll may be engaged on a pintle 20 carried by the other end of the swinging support. By means of this arrangement, when the swinging support is shifted upon its pivotal center 21, the guard roll will be disengaged from the film feeding roll and the loop confining roll will be simultaneously moved away from the guide roll 13, thus permitting the film to be freely inserted in the machine. For the purpose of manipulating these two rolls, a handle 22 is preferably provided which may, as shown in Fig. 2, be simply an extension of one of the pintles carrying either the roll 15 or the roll 19. The guard and guide rolls are normally held in their operative position by some suitable means such as the spring 23.

It will be understood that my invention as a whole or the various features thereof may be applied either to the camera for taking the pictures or to the projector for exhibiting the same.

What is claimed, is:

1. In a moving picture machine, a film feeding roll, a guide roll spaced apart therefrom to permit the film to assume a loop between the film advancing roll and guide roll, a movable support, a guard carried thereby for coöperation with the film feeding roll, and a guide also carried by the support for coöperation with the guide roll.

2. In a moving picture machine, a film feeding roll and a guide roll spaced apart therefrom, a swinging support, a guard roll carried by one end of said support to coöperate with the film feeding roll, and a guide roll carried by the other end of the support to coöperate with the first guide roll.

3. In a moving picture machine, a film feeding roll and a guide roll spaced apart therefrom, a swinging support, a guard roll carried by one end of said support to coöperate with the film feeding roll, a guide roll carried by the other end of the support to coöperate with the first guide roll, and means for normally holding said support so that the rolls carried thereby will be in operative position.

4. In a moving picture machine, a film feeding roll, a guide roll spaced apart therefrom, a pivoted support, pintles carried by the opposite ends of said support, rolls engaged on said pintles for coöperation with the film feeding roll and the guide roll and one of the pintles being extended to serve as a handle for operating the support.

5. In a moving picture machine, a film feeding roll, a guide roll spaced apart therefrom to permit the film to form a loop between the film feeding roll and the guide roll, and a loop-confining guide roll movably related to the first guide roll and spaced therefrom so as to guide the film to the first guide roll.

6. In a moving picture machine, an adjustable film feeding sprocket, a guide roll located at a distance therefrom to permit the film to form a loop between the sprocket and the guide roll, a pivoted support, a guard roll carried by one end of said support for engagement with the sprocket roll, a roll carried by the other end of the support adapted to guide the film to the guide roll, and means for normally holding the support with the rolls carried thereby in operative relation.

7. In a moving picture machine, a film feeding roll, a guide roll located at a distance therefrom to permit the film to form a loop between the film feeding roll and guide roll, a guard roll associated with the film feeding roll to hold the film in engagement therewith, a loop-confining guide roll adjacent the first guide roll to direct the film thereto, and means for simultaneously withdrawing the guard roll from the film feeding roll and the loop-confining guide roll from the first guide roll.

8. In a moving picture machine, relatively fixed rolls spaced apart and over which the film is guided, a swinging support pivoted on a center located between the rolls, and rolls carried on the ends of said support, one of said movable rolls coöperating with the underside of one of the stationary rolls and the other movable roll coöperating with the upperside of the other stationary roll.

9. In a moving picture machine, a film feeding roll, a guide roll spaced apart therefrom, a swinging support pivoted between said rolls, and rolls carried on the ends of the swinging support coöperating one with the upper side of the guide roll and the other with the underside of the film feeding roll.

Signed at New York in the county of New York and State of New York this 4th day of November A. D. 1910.

JAMES A. CAMERON.

Witnesses:
  LAURA E. SMITH,
  AXEL V. BEEKER.